United States Patent
Bodio et al.

(10) Patent No.: US 9,026,820 B2
(45) Date of Patent: May 5, 2015

(54) COMMUNICATION LINK AND NETWORK CONNECTIVITY MANAGEMENT IN LOW POWER MODE

(71) Applicant: Intel Corporation, Santa Clara, CA (US)

(72) Inventors: James F. Bodio, Tigard, OR (US); Gyan Prakash, Beaverton, OR (US); Rajesh Poornachandran, Portland, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 13/730,921

(22) Filed: Dec. 29, 2012

(65) Prior Publication Data

US 2014/0189392 A1    Jul. 3, 2014

(51) Int. Cl.
    *G06F 1/26*      (2006.01)
    *G06F 1/32*      (2006.01)

(52) U.S. Cl.
CPC ........... *G06F 1/3203* (2013.01); *Y02B 60/1228* (2013.01); *G06F 1/3243* (2013.01)

(58) Field of Classification Search
CPC .................................................... G06F 1/3203
USPC .......................................... 713/300, 320, 324
See application file for complete search history.

(56) References Cited

U.S. PATENT DOCUMENTS

| | | | |
|---|---|---|---|
| 2008/0148083 A1* | 6/2008 | Pesavento et al. | 713/322 |
| 2009/0157865 A1 | 6/2009 | Winter | |
| 2010/0293404 A1 | 11/2010 | Diab | |
| 2011/0270972 A1 | 11/2011 | Mukherjee et al. | |
| 2012/0201143 A1 | 8/2012 | Schmidt et al. | |
| 2012/0320771 A1 | 12/2012 | Chini et al. | |

OTHER PUBLICATIONS

International Search Report and Written Opinion received for PCT Application No. PCT/US2013/046570, mailed on Oct. 7, 2013, 10 pages.

* cited by examiner

*Primary Examiner* — Mark Connolly
(74) *Attorney, Agent, or Firm* — Alpine Technology Law Group LLC

(57) ABSTRACT

Methods and apparatus relating to communication link and network connectivity management in low power mode are described. In one embodiment, logic manages one or more external communication network links (also referred as "links") in response to a determination that a processor has entered a low power consumption state and based on policy information. The logic also blocks/intercepts one or more signals, corresponding to management of the one or more links, that are directed to the processor to allow the processor to stay in the low power consumption. Other embodiments are also claimed and disclosed.

30 Claims, 7 Drawing Sheets

COMMUNICATION LINK AND NETWORK CONNECTIVITY MANAGEMENT IN LOW POWER MODE

FIELD

The present disclosure generally relates to the field of electronics. More particularly, an embodiment of the invention relates to communication link and network connectivity management in low power mode.

BACKGROUND

Generally, one of the highest power consuming components in computing system is a processor. To reduce power consumption, some implementations may attempt to have the processor enter a sleep or standby mode as often and as long as possible. However, these attempts may be defeated due to occurrence of various events, e.g., triggered by other components in the system, which may force a processor to exit a lower power consumption state.

In turn, the higher power consumption may also increase heat generation. Excessive heat may damage components of a computer system. Further, the higher power utilization may increase battery consumption, e.g., in mobile computing devices, which in turn reduces the length of time a mobile device may be operated prior to recharging. The additional power consumption may additionally require usage of larger batteries that may weigh more. Heavier batteries reduce the portability or usability of a mobile computing device.

Accordingly, overall system power consumption and utility may be directly related to how long a processor is maintained in a lower power consumption state.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
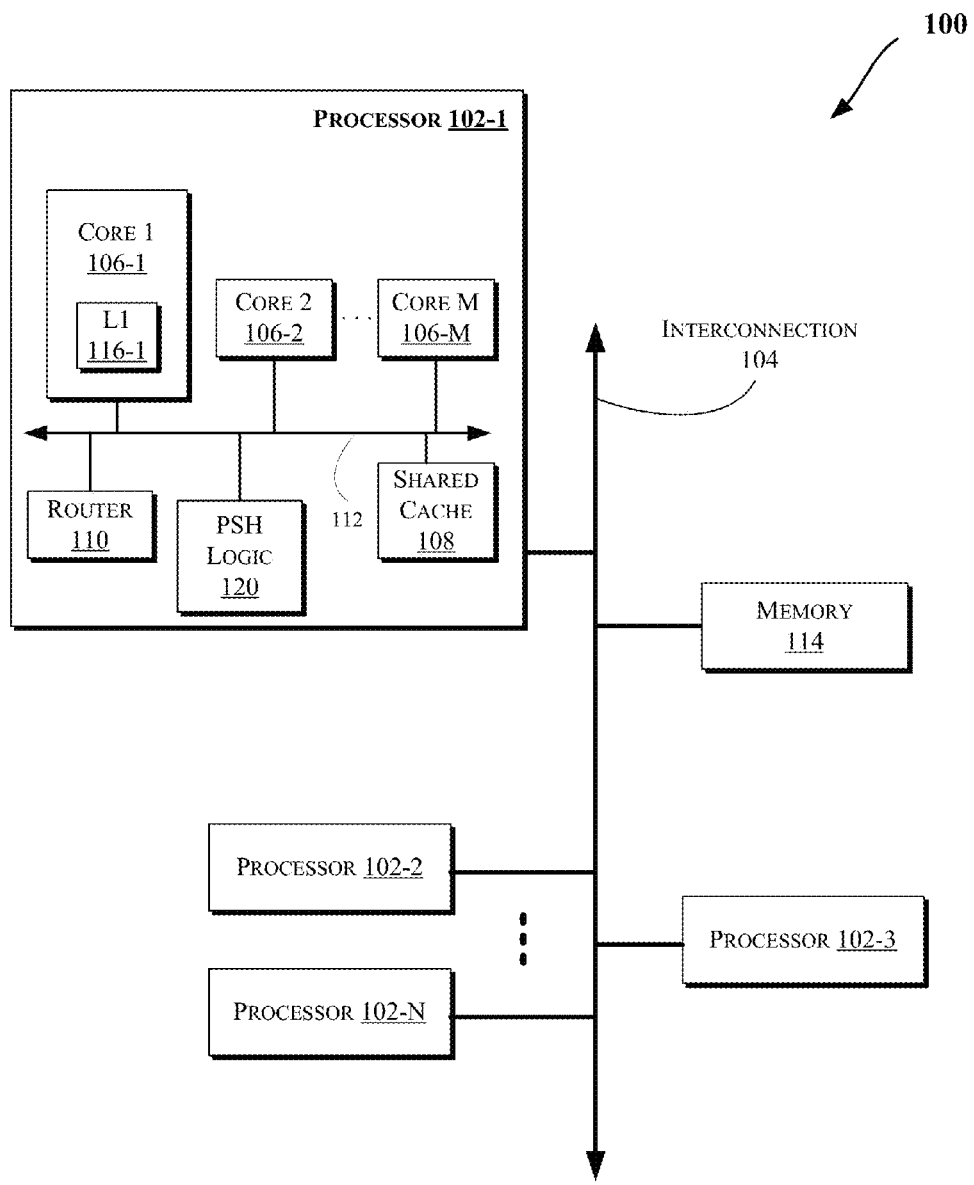
FIGS. 1, 3, and 5-7 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof. Also, the use of "instruction" and "micro-operation" (uop) is interchangeable as discussed herein.

Mobile devices may have multiple communication hardware interfaces such as Wi-Fi (Wireless Fidelity), GSM (Global System for Mobile communication, such as Third Generation (3G), Fourth Generation (4G), or LTE (Long Term Evolution)) or CDMA (Code Division Multiple Access) cellphone technologies for WWAN (Wireless Wide Area Network) connectivity. The OS (Operating System) or device drivers usually keep track of the available networks and then connect to the available network using a communication interface, e.g., based on user policy or power versus performance profiles. However, the following challenges are unaddressed with some current mobile networking solutions in terms of network detection and/or connection management: (a) even in low power states such as S0ix, active-idle-on, etc. mobile devices may use various device drivers corresponding to different links such as Wi-Fi, 3G, LTE, etc. to maintain the link status/connectivity with the access point or base station; (b) in case of AOAC (Always On Always Connected), Wi-Fi MAC (Media Access Control) can maintain the connectivity in S0ix mode and 3G/GSM/LTE connectivity can be maintained by WWAN modem (both of these devices independently maintain the network link connection and this approach is not power efficient); (c) maintaining link connectivity and status via various device drivers running on a processor (such as an Intel® Architecture (IA)) is very inefficient in terms of power and performance as most often only one interface is used for network communication; for example, even if there is good signal and connectivity for both 3G and Wi-Fi, most often data packets are routed via Wi-Fi—same is being considered for voice to bypass 3G for efficiency reasons); and/or (d) commonalities on the connectivity management implementations across various communication links are not leveraged; instead, each link has a dedicated vertical software stack based solution from device driver to software application for each link.

Some of the embodiments discussed herein provide a mechanism for communication link and network connectivity management in low power mode. In an embodiment, logic (also referred to herein as a Platform Services Hub (PSH)) provides a generic interface for OS, device driver(s), and/or software application(s) (e.g., independent of host OS) to manage one or more links when a (e.g., main or bootstrap) processor core is power gated or otherwise is in a lower power consumption state than a normal (or runtime) power consumption state.

In an embodiment, an (e.g., embedded) controller (such as PPSH may use the stored policy information in (e.g., real-time) to manage network connectivity.

The techniques discussed herein may be used in any type of a computing system, such as the systems discussed with reference to FIGS. 1-2 and 5-7. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, a router 110, and/or a logic 120. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

In one embodiment, the PSH logic 120 may operate to reduce the number of events that may cause a processor/platform to exit a low power consumption state. In some current systems, a main processor, drivers, firmware, etc. may need to be waken (i.e., having to exit a lower power consumption state) to provide link maintenance. By contrast, logic 120 may provide a generic interface for (e.g., all) communication links on the platform (e.g., without performing any protocol processing) and take care of link manageability to allow for the processor(s) to stay in a low power consumption (e.g., sleep) state. In an embodiment, logic 120 may inform the processor(s) regarding link status after the processor(s) exit their lower power consumption state(s).

In some embodiments, logic 120 may perform its tasks without compromising QoS (Quality Of Service) or user experience. In some embodiments, operations performed by logic 120 may be controlled or configured via OS and/or software application(s) (e.g., that may be stored in the memory 114), e.g., per user or Original Equipment Manufactures (OEMs) (based on information from a User Interface in some embodiments). Additionally, information relating to the application policy configuration may be stored in any of the memories discussed herein, including for example, memory 114 and/or caches 108/116, etc.

Figure 2:
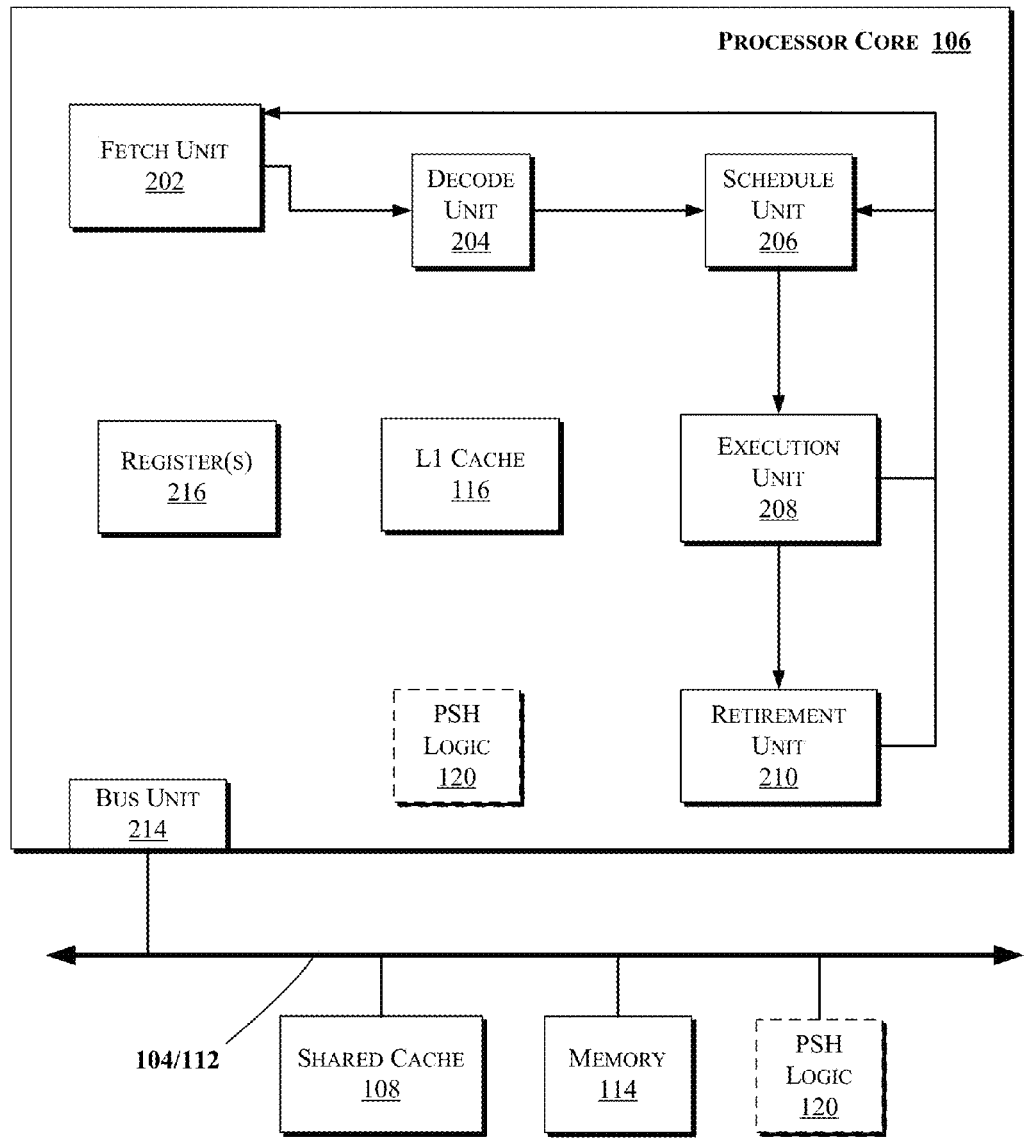
FIG. 2 illustrates a block diagram of portions of a processor core and other components of a computing system, according to an embodiment.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 5-7. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values related to assigned app priorities and/or sub-system states (modes) association.

Furthermore, even though FIG. 1 illustrates the logic 120 to be coupled to the core 106 via interconnect 112, in various embodiments the logic 120 may be located elsewhere such as inside the core 106, coupled to the core via bus 104, etc.

Moreover, the current generation of smart phones, tablets, netbook platforms, etc. may support granular power management via OSPM (Operating System Power Management), PMU (Power Management Unit), and SCU (System Controller Unit). The SCU along with the Operating System may provide the Always On Always Connected (AOAC) capability to the platform. Based on the OS power manager's guidance, the SCU may determine the correct power level for different sub-systems (including CPU (Central Processing Unit) or processor) in the platform. External events like timer interrupt, interrupt from Communication (Comms) module, etc., may be forwarded by the SCU to CPU thereby waking up the CPU. Apart from subsystem interrupts, CPU also may be woken up by applications (apps) due to timers or events to provide AOAC functionality. These wake(s) reduce the residency time of the CPU in the sleep or deep sleep state, resulting in additional power consumption. Also, platform power-unaware apps may be active resulting in waking of the CPU and other sub-systems, even though the power manager entity has put the platform into standby/sleep mode. In addition, applications may set timers and wake up the CPU periodically even though there is no change to a resource under consideration. In an embodiment, logic 120 blocks/intercepts any such signals (or messages or packets) from these entities to allow the CPU to stay in a lower power consumption state longer.

Figure 3:
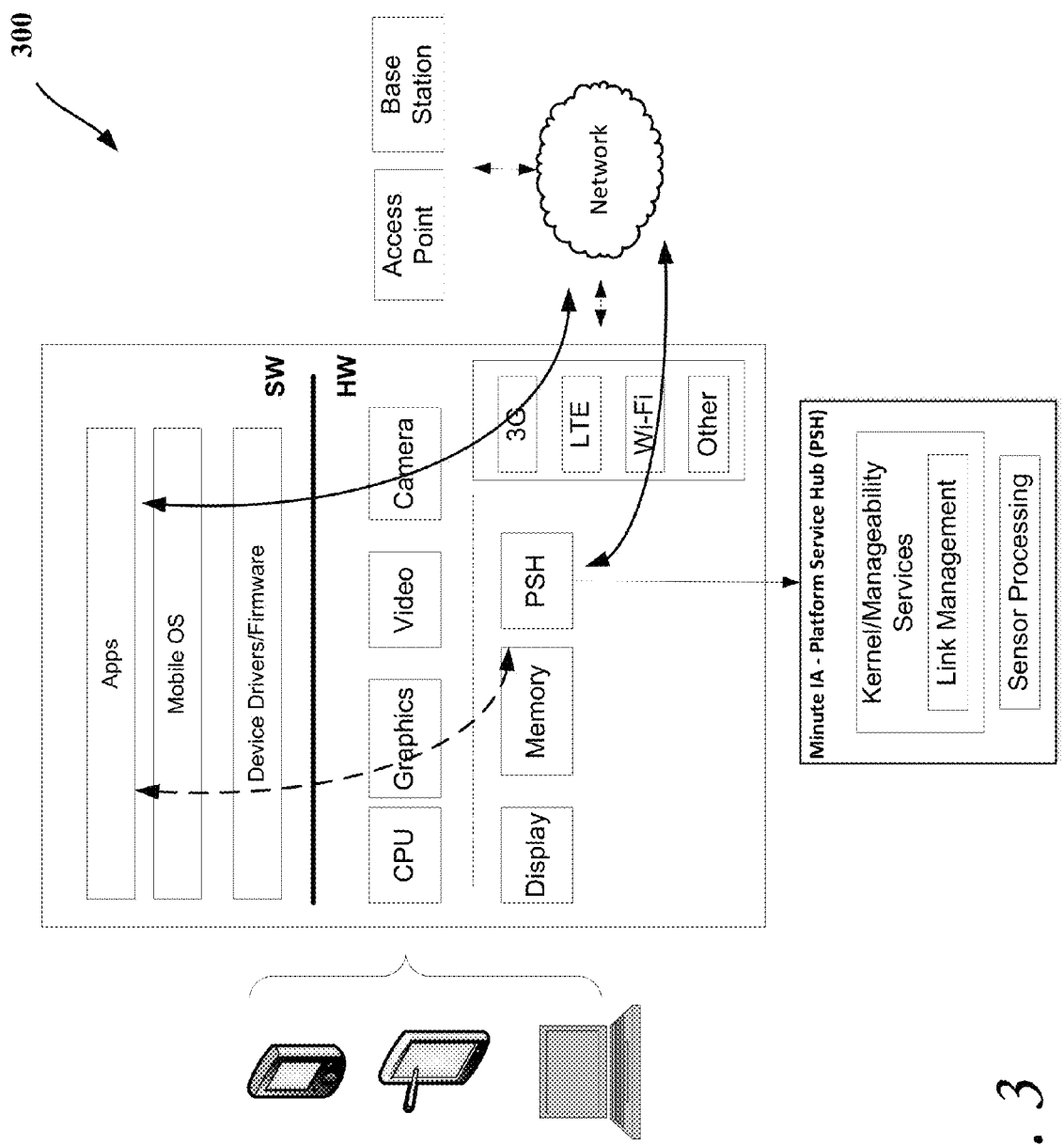

FIG. 3 illustrates a block diagram of a system 300 in which a PSH logic manages communication link(s) and/or network connectivity, according to some embodiments. As shown, system 300 includes various hardware such as a host CPU/processor, graphics logic, video, display, and memory to provide compute and storage capability. System 300 also includes a camera (e.g., to provide image/video capture capability), Platform Services Hub (PSH) logic (which may be an ultra low power processor core, relieving the main power hungry cores/CPU from handling the link manageability functionality). Link manageability may be provided in software, hardware, firmware, or combinations thereof as a generic interface for all the communication links to OS/applications or device drivers and perform the necessary link management.

As illustrated in FIG. 3, system 300 also includes one or more of 3G, LTE, Wi-Fi, or other communication interfaces. Also, software (SW) may include device driver(s), firmware, (e.g., Mobile) OS, and/or software applications (Apps). Further, PSH logic may include a kernel/manageability services that include link management logic and processing hardware to perform processing of link information (e.g., detected by one or more sensor(s) that detect link status and connectivity) to manage links and/or network connectivity. Moreover, in various embodiments, system 300 may include any component in a computing system such as the components discussed with reference to FIGS. 1-2 and 4-6, e.g., that are capable of waking a computing system/platform and/or processor.

In one embodiment, the PSH logic 120 may operate to reduce the number of events that may cause a processor/platform to exit a low power consumption state. In some current systems, a main processor, drivers, firmware, etc. may need to be waken (i.e., having to exit a lower power consumption state) to provide link maintenance. By contrast, logic 120 may provide a generic interface for (e.g., all) communication links on the platform (e.g., without performing any protocol processing) and take care of link manageability to allow for the processor(s) to stay in a low power consumption (e.g., sleep) state. In an embodiment, logic 120 may inform the processor(s) regarding link status after the processor(s) exit their lower power consumption state(s).

In some embodiments, logic 120 may perform its tasks without compromising QoS (Quality Of Service) or user experience. In some embodiments, operations performed by logic 120 may be controlled or configured via OS and/or software application(s) (e.g., that may be stored in the memory 114), e.g., per user or Original Equipment Manufactures (OEMs) (based on information from a User Interface in some embodiments). Additionally, information relating to the application policy configuration may be stored in any of the memories discussed herein, including for example, memory 114 and/or caches 108/116, etc.

Figure 4:
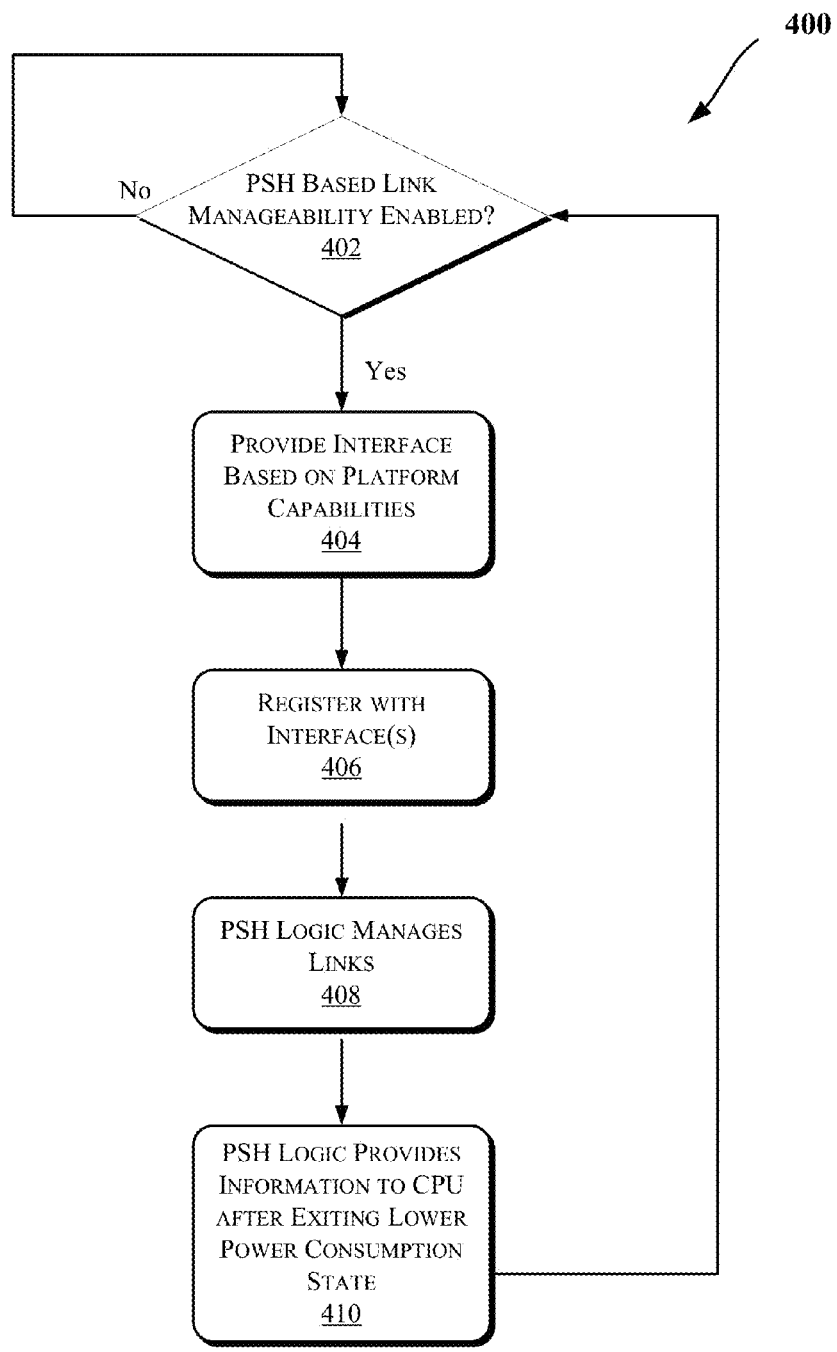
FIG. 4 illustrates a flow diagram in accordance with some embodiments.

FIG. 4 illustrates a flow diagram of a method 400 for implementing PSH logic operations, according to some embodiments. Furthermore, the operations discussed with reference to FIG. 4 may be performed by one or more components of FIGS. 1-3 and 5-7 (such as PSH logic 120).

Referring to FIG. 4, at an operation 402, it is determined whether PSH based link manageability is enabled. If not, method 400 stops or waits until PSH based link management is enabled. Once PSH based link management is enabled, an operation 404 provides (e.g., generic) interface(s) based on platform capabilities. For example, PSH logic 120 generates/exports appropriate interface(s) based on platform capabilities (e.g., type of communication interface(s), speed(s), etc.) for OS/application/deriver to register with. At an operation 406, communication device driver(s) register with the interface(s) provided by the PSH logic 120. In an embodiment, PSH logic 120 is provided with the current profile for the platform with respect to communication interfaces (such as one or more of 3G, 4G, LTE, Wi-Fi, etc.) at operation 406. In one embodiment, OS/application/driver components register with the PSH and provide the current platform profile configuration which describes the necessary links that should be kept active and the dependencies between the various communication links at operation 406. One example is calls can be routed via Wi-Fi as long as strong Wi-Fi is available; as a result, 3G can be in low power and 3G needs to be brought to active state as soon as Wi-Fi availability drops below a threshold.

At an operation 408, based on the link requirements/dependency (e.g., provided by OS/application/driver), PSH takes over the cumulative link management (e.g., by sending one or more necessary keep alive packets on appropriate channel, power gating unnecessary links, etc.). This may be done transparently to the OS/application/driver to allow the CPU to remain in or more quickly enter a lower power consumption state. Also, PSH logic may determine which link(s) need to be active for the given profile and turn off unnecessary link(s), e.g., to reduce power consumption. For example, if there is no Wi-Fi or if Wi-Fi is inaccessible (e.g., due to a passphrase being unavailable), system may time out (which may be configured via profile(s)) and turn off Wi-Fi if there is no active connection.

At an operation 410, based on wake configuration mask (e.g., which may be provided by OS/application/driver (e.g., during registration) or responses from various communication interface(s)), PSH would maintain the current active links and/or wake up the CPU on need basis or in response to an event. This allows the CPU to reside in lower power states longer. On wake up (e.g., from S0i3), the CPU may query the PSH logic regarding the link status and subsequently use appropriate communication mechanisms to take over the link management and/or network connectivity tasks performed by the PSH logic during the low power consumption residency of the CPU.

In some embodiments, PSH logic 120 may allow for one or more of: (a) unified and/or abstracted interface handled via low power PSH logic; (b) PSH logic is aware of which connectivity to maintain, e.g., such that duplicate efforts are eliminated and connectivity is more efficient; (c) very power efficient as centralized link manageability is done via PSH logic instead of IA processor (hence, frequent wakes to IA processor are avoided); (d) PSH logic just maintains the link connectivity; (e) no protocol handling is performed in PSH logic (rather, individual device drivers take care of protocol processing; and/or (e) OS and/or device drivers receive the active link status from PSH logic when processor exits from low power platform states such as s0ix.

Figure 5:
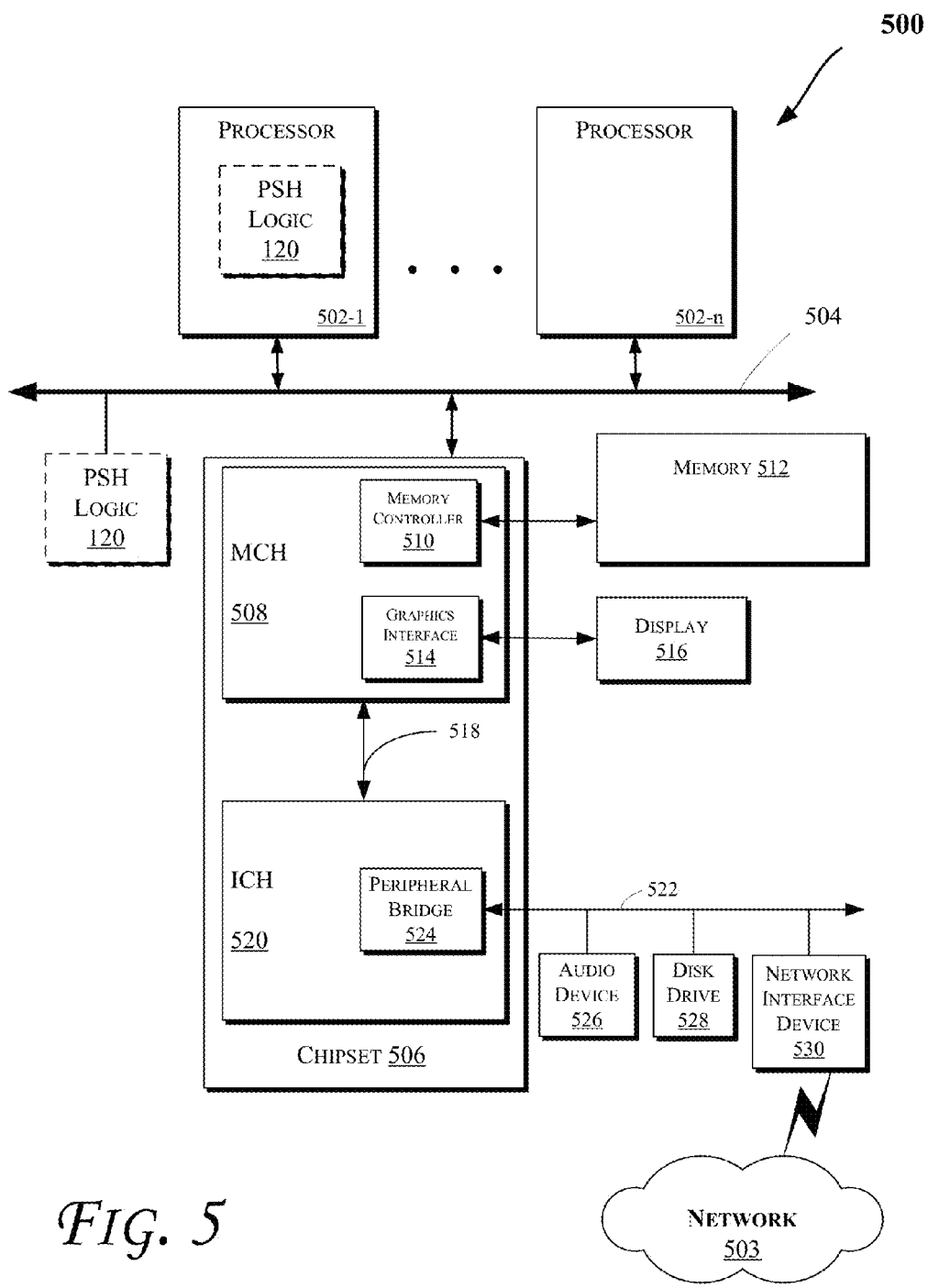

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include the logic 120 discussed with reference to FIGS. 1-4. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, touch screen, camera, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, the graphics accelerator 516 may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
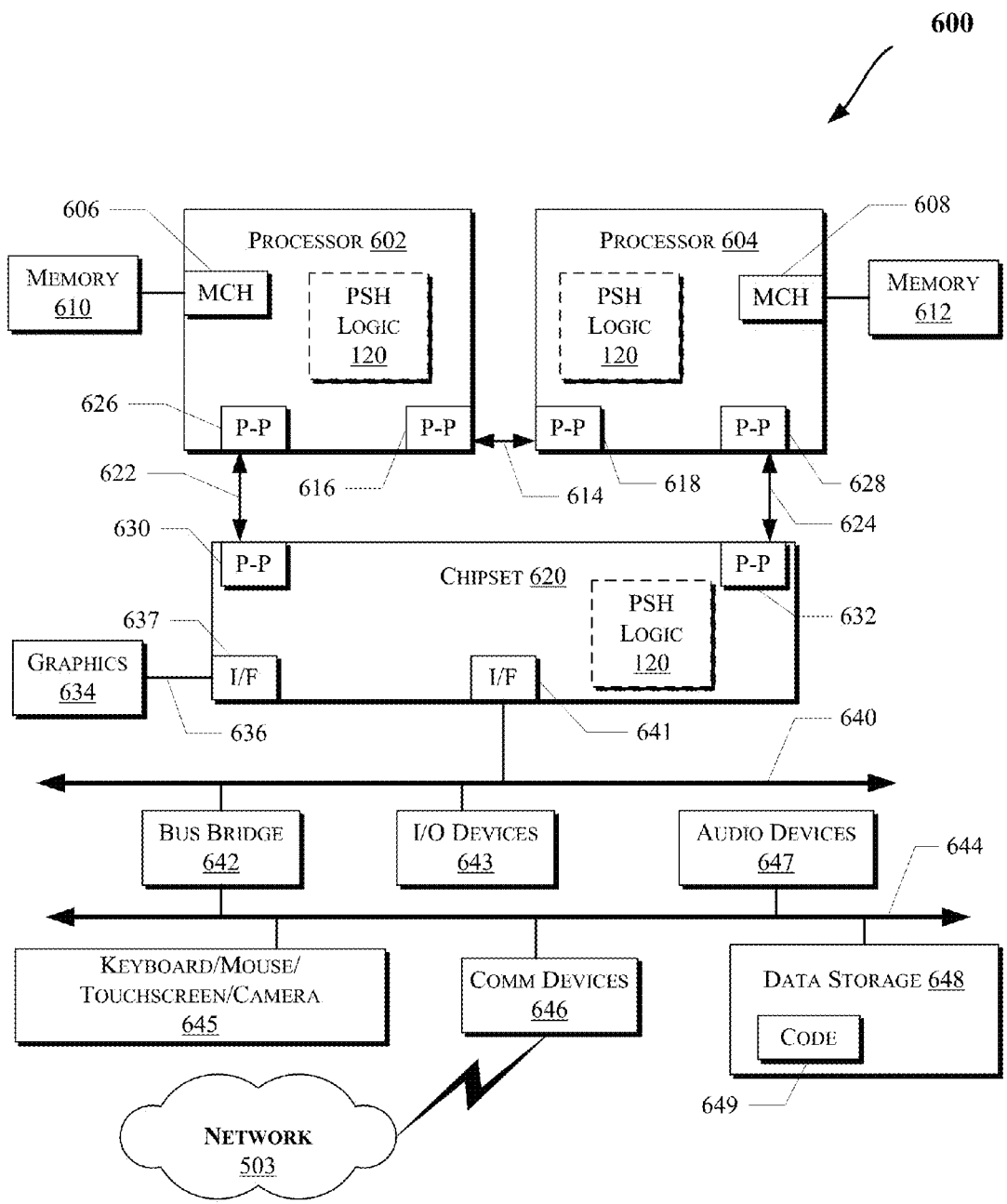

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, the logic 120 of FIGS. 1-4 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse/touchscreen/camera 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

Figure 7:
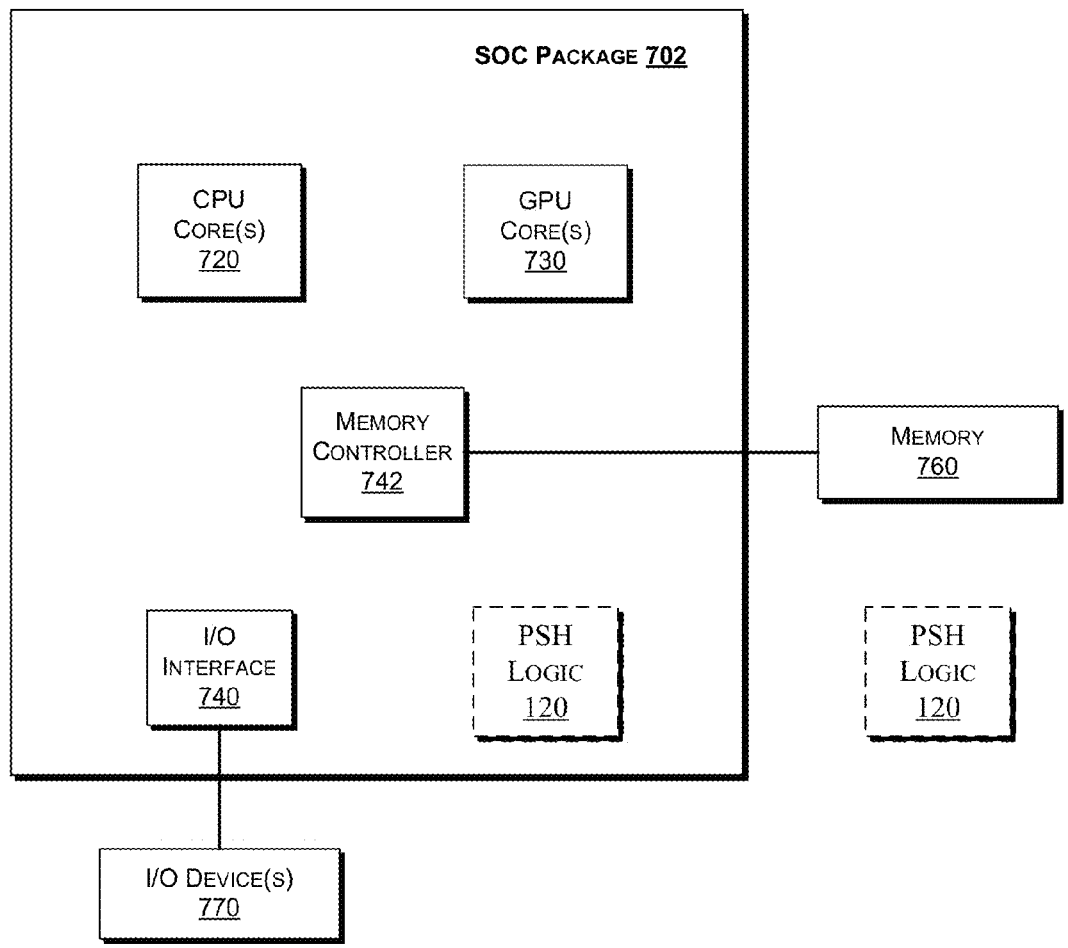

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the PSH logic 120 in an embodiment. Alternatively, the PSH logic 120 may be provided outside of the SOC package 702 (i.e., as a discrete PSH logic).

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, at least partially implemented in hardware, to manage one or more links, based on policy information, in response to a determination that a processor has entered a low power consumption state,
   wherein the logic is to block one or more signals, corresponding to management of the one or more links, that are directed to the processor to allow the processor to stay in the low power consumption state.

2. The apparatus of claim 1, wherein the logic is to transmit a keep alive packet on at least one of the one or more links while the processor is in the low power consumption state.

3. The apparatus of claim 1, wherein the processor is to receive link status information, corresponding to the one or more links, after the processor exits the low power consumption state.

4. The apparatus of claim 1, wherein the logic is to provide a generic interface for the one or more links.

5. The apparatus of claim 1, wherein the logic is to provide a generic interface for the one or more links and without performance of protocol processing.

6. The apparatus of claim 1, wherein the logic is to manage the one or more links based on one or more signals that are caused to be generated by one or more of: an operating system, a device driver, and an application software.

7. The apparatus of claim 1, wherein the policy information is to indicate how each of the one or more links is to be maintained.

8. The apparatus of claim 1, wherein the policy information is received from a user.

9. The apparatus of claim 1, wherein the policy information is to be provided based on one or more profiles.

10. The apparatus of claim 1, wherein the processor comprises a plurality of processor cores.

11. The apparatus of claim 1, wherein one or more of a memory, the processor, and the logic are on a same integrated circuit device.

12. A computer-readable medium to store instructions that when executed by a first processor cause the first processor to:
    manage one or more links, based on policy information, in response to a determination that a second processor has entered a low power consumption state,
    wherein the first processor is to block one or more signals, corresponding to management of the one or more links, that are directed to the second processor to allow the second processor to stay in the low power consumption state.

13. The computer-readable medium of claim 12, wherein the instructions cause the first processor to transmit a keep alive packet on at least one of the one or more links while the second processor is in the low power consumption state.

14. The computer-readable medium of claim 12, wherein the instructions cause the second processor to receive link status information, corresponding to the one or more links, after the second processor exits the low power consumption state.

15. The computer-readable medium of claim 12, wherein the instructions cause the first processor to provide a generic interface for the one or more links.

16. The computer-readable medium of claim 12, wherein the instructions cause the first processor to provide a generic interface for the one or more links and without performance of protocol processing.

17. The computer-readable medium of claim 12, wherein the instructions cause the first processor to manage the one or more links based on one or more signals that are caused to be generated by one or more of: an operating system, a device driver, and an application software.

18. The computer-readable medium of claim 12, wherein the policy information is to indicate how each of the one or more links is to be maintained.

19. The computer-readable medium of claim 12, wherein the policy information is received from a user.

20. The computer-readable medium of claim 12, wherein the policy information is to be provided based on one or more profiles.

21. The computer-readable medium of claim 12, wherein the first or second processors are to comprise a plurality of processor cores.

22. The computer-readable medium of claim 12, wherein one or more of a memory, the first processor, and the second processor are on a same integrated circuit device.

23. A system comprising:
   memory to store data;
   logic, at least partially implemented in hardware, to manage one or more links, based on policy information stored in the memory, in response to a determination that a processor has entered a low power consumption state, wherein the logic is to block one or more signals, corresponding to management of the one or more links, that are directed to the processor to allow the processor to stay in the low power consumption state.

24. The system of claim 23, wherein the logic is to transmit a keep alive packet on at least one of the one or more links while the processor is in the low power consumption state.

25. The system of claim 23, wherein the processor is to receive link status information, corresponding to the one or more links, after the processor exits the low power consumption state.

26. The system of claim 23, wherein the logic is to provide a generic interface for the one or more links.

27. The system of claim 23, wherein the logic is to provide a generic interface for the one or more links and without performance of protocol processing.

28. The system of claim 23, wherein the logic is to manage the one or more links based on one or more signals that are caused to be generated by one or more of: an operating system, a device driver, and an application software.

29. The system of claim 23, wherein the policy information is to indicate how each of the one or more links is to be maintained.

30. The system of claim 23, wherein the policy information is received from a user or based on one or more profiles.

* * * * *